United States Patent [19]

Flanders

[11] 4,430,803
[45] Feb. 14, 1984

[54] CIRCUIT FOR LEVITATED BALL INCLINOMETER

[75] Inventor: Thomas E. Flanders, Houston, Tex.

[73] Assignee: General Electric Company, Philadelphia, Pa.

[21] Appl. No.: 388,680

[22] Filed: Jun. 15, 1982

[51] Int. Cl.³ .............................................. G01C 9/06
[52] U.S. Cl. .................................... 33/366; 33/363 Q
[58] Field of Search ..................... 33/366, 356, 363 Q, 33/312, 313

[56] References Cited

U.S. PATENT DOCUMENTS

| | | | |
|---|---|---|---|
| 2,893,134 | 7/1959 | Shea et al. | 33/366 |
| 3,421,227 | 1/1969 | Turner et al. | 33/366 |
| 3,492,738 | 2/1970 | Simon | 33/366 |
| 3,512,852 | 5/1970 | North | 33/366 |

*Primary Examiner*—Willis Little
*Attorney, Agent, or Firm*—Allen E. Amgott

[57] ABSTRACT

An inclinometer has a ferromagnetic ball levitated between pairs of electromagnets. When the inclinometer changes attitude, the ball moves in response to the change in relative gravity direction. Alternating currents are applied to the proper electromagnets and in the magnitudes needed to re-center the ball. The same signals which determine the re-centering currents are the inclinometer outputs.

3 Claims, 2 Drawing Figures

CIRCUIT FOR LEVITATED BALL INCLINOMETER

BACKGROUND OF THE INVENTION

This invention relates generally to inclinometers and more particularly to an improved circuit for a levitated ball inclinometer.

U.S. patent application Ser. No. 223,381, which matured into U.S. Pat. No. 4,344,235 describes a levitated ball inclinometer of the type this invention relates to, however, a direct current was used in that inclinometer to restore the levitated ball to the central position. It was observed that a small amount of residual magnetism resulted due to magnetic hysteresis. This hysteresis caused the inclinometer output to display an apparent offset characteristic, which, in turn, caused a decrease in the accuracy of the inclinometer.

SUMMARY OF THE INVENTION

An alternating current of high frequency is applied to the ferromagnetic ball of a levitated ball inclinometer. This current flows to the pairs of opposed plates on each axis in a magnitude proportional to the displacement of the ball relative to each axis. For each axis a signal is produced having a polarity determined by the direction of the displacement of the ball and a magnitude determined by the amount the ball is displaced relative to that axis. In response to these signals, an alternating current is produced for each axis which is applied to the coil of the pole piece farthest from the ball to attract the ball to it.

DETAILED DESCRIPTION OF THE INVENTION

Figure 1:
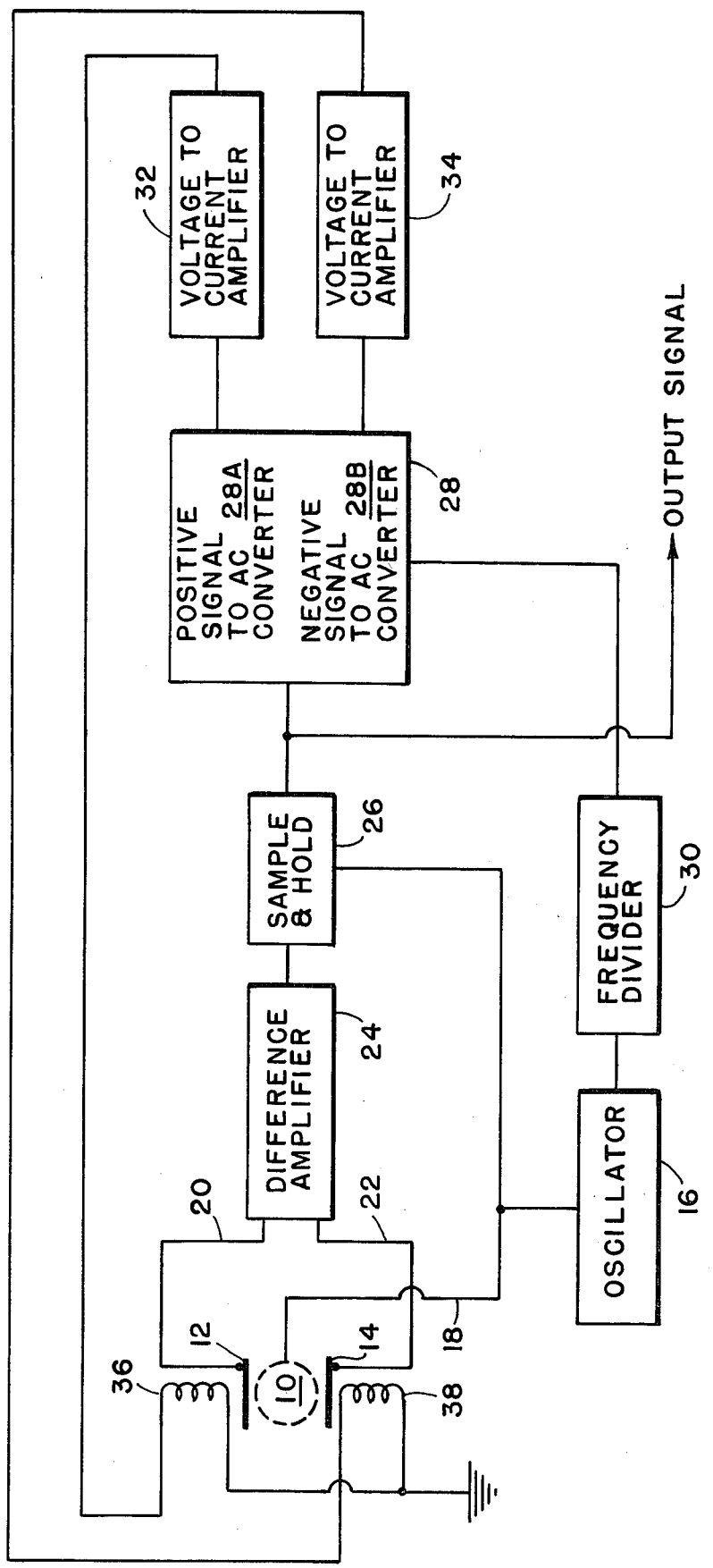
FIG. 1 is a schematic for the circuitry for one axis of an inclinometer.

FIG. 1 shows schematically the circuitry for one axis of a levitated ball inclinometer. Similar circuitry is needed for the second axis to provide a two axis configuration, and for the third axis, if a three axis configuration is desired.

An iron or other ferromagnetic ball 10 is positioned between metal plate 12 and 14. (Metal plates 12 and 14 are actually the pole faces of electromagnets as is fully described in the previously mentioned patent application (U.S. Pat. No. 4,344,235).

Oscillator 16 produces a high frequency alternating current of from 30,000 to 60,000 Hz. The current produced by oscillator 16 (preferably in the form of a square wave) is carried by conductor 18 to ball 10 and from there to plates 12 and 14. Two capacitors are thus effectively formed, one by ball 10 and metal plate 12 and the other by ball 10 and metal plate 14. It will be observed that if ball 10 is closer to one of the two metal plates than the other, then a larger current will flow to that plate.

The currents which flow to plates 12 and 14 are carried by conductors 20 and 22 to difference amplifier 24. A square wave is produced by difference amplifier 24 which will be either in phase with the output of oscillator 16 or 180 degrees out of phase with this output. The phase relationship indicates whether ball 10 is closer to plate 12 or to plate 14. The amplitude of the square wave produced by difference amplifier is proportional to the difference in the currents flowing to plates 12 and 14 from ball 10.

The square wave produced by difference amplifier 24 is delivered to sample and hold circuit 26. Sample and hold circuit 26 also receives the output of oscillator 16 and uses this output to trigger a gate (not shown) which will pass one half cycle of the square wave from difference amplifier 24. This voltage charges a capacitor (not shown) in sample and hold circuit 26 to a level proportional to the displacement of ball 10 between plates 12 and 14 and the output of sample and hold circuit is thus a DC voltage indicative of this displacement. This output signal is the information desired from the inclinometer (relating to this single axis) because the displacement of ball 10 is caused by a positioning of the axis other than horizontal.

In order to receive updated information as the inclinometer moves, it is desired to exert a restoring force on ball 10 to move it to a central position between plates 12 and 14. The DC voltage produced by sample and hold circuit 26 is therefore applied to converter 28. Converter 28 has two parts. One part responds to the DC voltage from sample and hold circuit 26 when the voltage is positive. This is positive signal to AC converter 28A. The other part responds to the DC voltage from sample and hold circuit 26 when the voltage is negative. This is negative signal to AC converter 28B.

Both positive converter 28A and negative converter 28B receive the output of frequency divider 30. Frequency divider 30 divides the high frequency output of oscillator 16 into a 50 Hz square wave. (A frequency lower than 40 Hz is not suitable as it is too close to the frequency response of the inclinometer, and a frequency greater than 60 Hz will tend to produce a repulsive force rather than the attractive force to be described, this will work but require more current.)

Only positive converter 28A or negative converter 28B will be operative at one time. The output of positive converter 28A is delivered to voltage to current amplifier 32, while the output of negative converter 28B is delivered to voltage to current amplifier 34.

Positive converter 28A converts the positive voltage level from sample and hold circuit 26 to a square wave, the amplitude of which is equal to the positive voltage level received by it.

In a similar manner, negative converter 28B converts the negative voltage level from sample and hold circuit 26 to a square wave, the amplitude of which is equal to the negative voltage level received by it.

Voltage to current amplifier 32 produces an output to drive coil 36 so as to attract ball 10 to plate 12. Similarly, voltage to current amplifier 34 produces an output to drive coil 38 so as to attract ball 10 to plate 14.

These outputs are alternating so that no buildup of magnetism occurs to cause hysteresis as occurred with a direct current drive.

Figure 2:
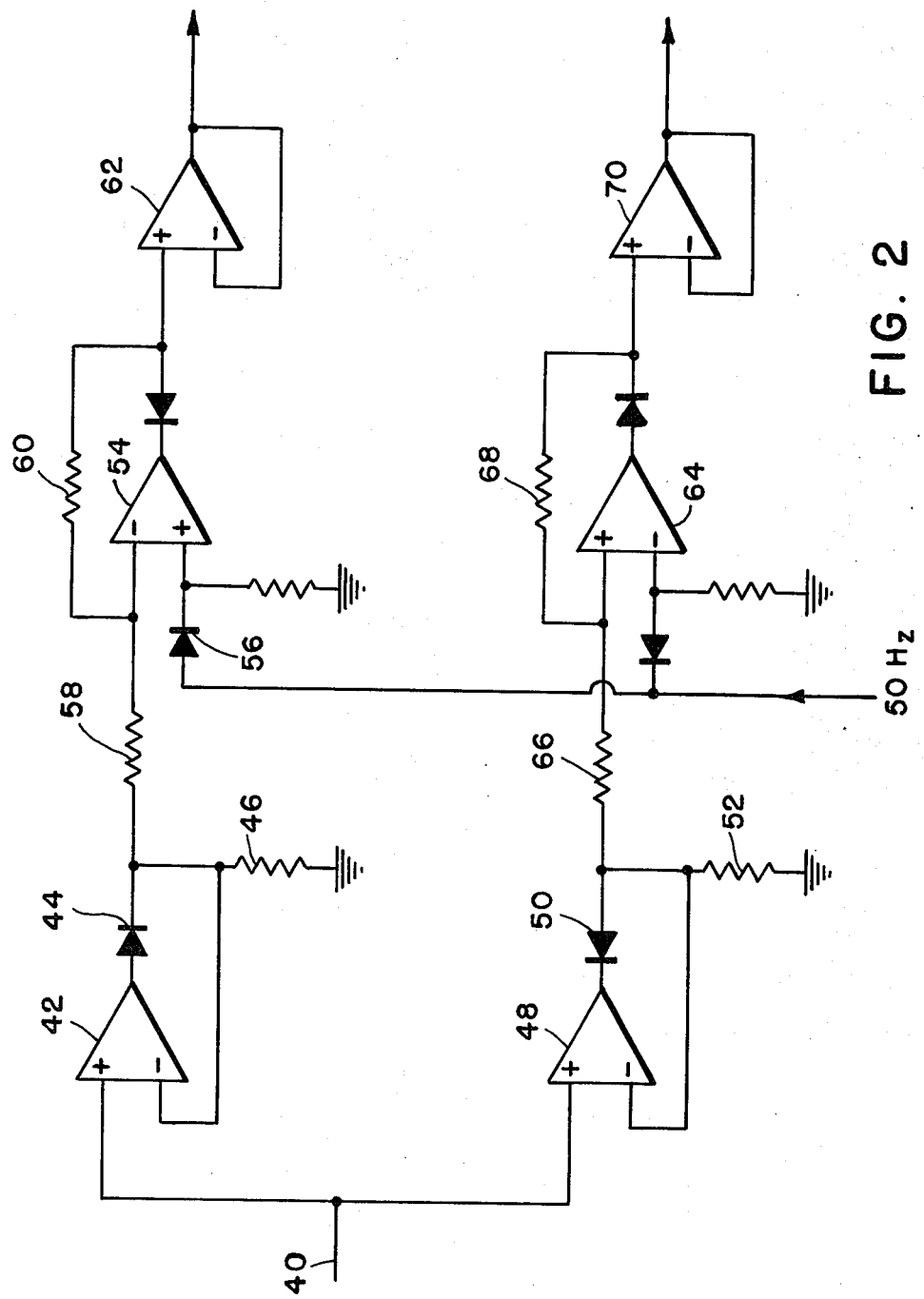
FIG. 2 is a schematic depicting the details of the circuit shown as a block diagram for a converter in FIG. 1.

The major difference between this circuit and that in the previously mentioned patent application is converter 28 which will now be described with reference to FIG 2.

Conductor 40 carries the voltage level produced by sample and hold circuit 26. This voltage will be either positive or negative and will have a magnitude proportional to the displacement of ball 10 as previously described.

Amplifier 42 with its associated diode 44 and resistor 46 will accept and pass only a positive voltage, whereas amplifier 48 and its associated diode 50 and resistor 52 will accept and pass only a negative voltage.

Assuming a positive voltage, amplifier 42, which has a gain of one, provides one input to amplifier 54. The other input to amplifier 54 is the 50 Hz square wave from frequency divider 30 (FIG. 1) which first passes diode 56 removing negative half cycles. During positive half cycles the output of amplifier 42 passes through resistors 58 and 60, while during negative half cycles the output of amplifier 42 passes through amplifier 54 where it is inverted. The input to amplifier 62 is therefore alternating positive and negative. Amplifier 62 is a buffer amplifier having a high input impedance.

Amplifier 62 delivers its output to voltage to current amplifier 32 (FIG. 1). Because the inclinometer is exposed to temperatures which vary over a large range (0°–200° C.) it is desired that current, which is essentially unaffected by temperature rather than voltage, which varies with temperature, be applied to coil 36.

The alternating current in coil 36 produces a magnetic field which attracts ball 10 during both half cycles without tending to magnetize the pole piece because the field changes in direction after each half cycle.

Assuming the voltage carried by conductor 40 (FIG. 2) is negative rather than positive as in the preceding description, amplifier 48 will provide an input to amplifier 64 during positive half cycles of the 50 cycle square wave. This input will be inverted to give a positive output from amplifier 64. During negative half cycles the negative output of amplifier 48 passes through resistors 66 and 68 around amplifier 64. Thus buffer amplifier 70 receives alternating positive and negative inputs and its alternating output feeds voltage to current amplifier 34 (FIG. 1) and then coil 38.

Summarizing, as the inclinometer containing ball 10 changes attitude, ball 10 will move in response to the gravitational force exerted upon it. A difference in current magnitude between that flowing from ball 10 to plate 12 and that flowing from ball 10 to plate 14 occurs. A signal is then produced having a magnitude and polarity indicative of the displacement of the ball. In a three axis inclinometer, three such signals would be produced. These signals provide the information desired about the attitude of the inclinometer at that particular moment. In order to prepare the inclinometer for the next output, the ball must be returned to a central position. This invention provides an alternating current for each axis which is applied to the single coil on each axis to attract ball 10 to the electromagnet pole piece of that coil.

Although a particular embodiment of a circuit for a levitated ball inclinometer has been illustrated and described, it will be obvious that changes and modifications can be made without departing from the spirit of the invention and the scope of the appended claims.

I claim:

1. In a levitated ball inclinometer having a ferromagnetic ball normally centrally positioned between opposed pairs of electromagnets with each of said opposed pairs of electromagnets located on an axis, an improved circuit for each of said opposed pairs of electromagnets for driving the coils of said electromagnets when said ball is displaced from its central position on said axis of said opposed pair of electromagnets comprising:
   means for producing a signal having a magnitude proportional to the displacement of said ball relative to said axis from a center position and a polarity indicative of the direction of said displacement; and
   means responsive to said signal to apply an alternating current to the coil of the electromagnet on said axis which is the farthest from said ball.

2. A levitated ball inclinometer in accordance with claim 1 wherein:
   said alternating current has a frequency of from 40 to 60 Hz.

3. In a levitated ball inclinometer having a ferromagnetic ball positioned between opposed pairs of electromagnets, an improved circuit for driving the coils of said electromagnets on any one axis comprising:
   oscillator means for producing a high frequency alternating current;
   means for applying said high frequency current to said ferromagnetic ball;
   said high frequency current passing to the pole pieces of the respective pairs of electromagnets in proportion to the distance of said ball from each said pole piece;
   difference amplifying means receiving the currents from a pair of said pole pieces on one axis and producing an output representative of the difference between said currents;
   sample and hold circuit means receiving the output of said difference amplifying means and producing a voltage level, the polarity of which is an indication of to which of said pair of pole pieces said ball is closest and the magnitude of which is an indication of the amount of displacement of the ball along said axis;
   first converter means responding to a positive output from said sample and hold circuit means by producing an alternating current voltage;
   first voltage to current amplifier means receiving the output from said first converter means and delivering an alternating current to the coil of one of said pair of pole pieces;
   second converter means responding to a negative output from said sample and hold circuit means by producing an alternating current voltage; and
   second voltage to current amplifier means receiving the output from said second converter means and delivering an alternating current to the coil of the other of said pair of pole pieces.

* * * * *